UNITED STATES PATENT OFFICE.

PAUL THOMASCHEWSKI, OF VOHWINKEL, NEAR ELBERFELD, GERMANY, ASSIGNOR TO FARBENFABRIKEN VORM. FRIEDR. BAYER & CO., OF ELBERFELD, GERMANY, A CORPORATION OF GERMANY.

ANTHRACENE COMPOUND.

938,617. Specification of Letters Patent. Patented Nov. 2, 1909.

No Drawing. Application filed June 29, 1909. Serial No. 505,035.

*To all whom it may concern:*

Be it known that I, PAUL THOMASCHEWSKI, doctor of philosophy, chemist, citizen of the German Empire, residing at Vohwinkel, near Elberfeld, Germany, have invented new and useful Improvements in Anthracene Compounds, of which the following is a specification.

This invention relates to the production of a new anthracene derivative, being chemically the leuco compound of 1.5-dibenzoyldiaminoanthraquinone. It is obtained by treating 1:5 - dibenzoyldiaminoanthraquinone with hydrosulfite and caustic soda lye.

20 parts of a 10 per cent. paste of 1.5-dibenzoyldiaminoanthraquinone, 20 parts of caustic soda lye (34° Bé.) and 2 parts of sodium hydrosulfite (free from water) are dissolved in 50 parts of water heated to 30° C. A volet-brown solution results from which the leuco compound is precipitated by the addition of common salt. It is in the shape of its sodium salt a slightly colored crystalline powder quickly turning brown by the action of air and then yellow, which is the color of the 1.5 - dibenzoyldiaminoanthraquinone, soluble in water with a violet-brown color, yellow flakes of 1.5-dibenzoyldiaminoanthraquinone being precipitated after some time; soluble in concentrated sulfuric acid with a green color quickly turning orange-red. Its alkaline solution dyes the textile fiber orange-yellow shades.

I claim:

The herein-described new anthracene derivative which is the leuco compound of 1.5-dibenzoyldiaminoanthraquinone obtainable by treating 1.5 - dibenzoyldiaminoanthraquinone with hydrosulfite and caustic alkali, which product is in the shape of its sodium salt a slightly colored crystalline powder quickly turning brown by the action of air and then yellow, soluble in water with a violet-brown color; soluble in concentrated sulfuric acid with a green color quickly turning orange-red; furnishing 1.5-dibenzoyldiaminoanthraquinone by treatment with oxidizing agents; and dyeing the textile fiber orange-yellow shades, substantially as described.

In testimony whereof I have hereunto set my hand in the presence of two subscribing witnesses.

PAUL THOMASCHEWSKI. [L. S.]

Witnesses:
 OTTO KÖNIG,
 WILLY KLEIN.